United States Patent
Makino et al.

(10) Patent No.: US 7,567,823 B2
(45) Date of Patent: Jul. 28, 2009

(54) FOLDABLE ELECTRONIC DEVICE

(75) Inventors: Masami Makino, Mizuho (JP); Takumi Sakai, Gifu (JP)

(73) Assignee: Kyocera Corporation, Kyoto (JP)

( * ) Notice: Subject to any disclaimer, the term of this patent is extended or adjusted under 35 U.S.C. 154(b) by 161 days.

(21) Appl. No.: 10/646,922

(22) Filed: Aug. 25, 2003

(65) Prior Publication Data

US 2004/0077385 A1 Apr. 22, 2004

(30) Foreign Application Priority Data

Aug. 23, 2002 (JP) ............................. 2002-244227

(51) Int. Cl.
*H04M 1/00* (2006.01)
*H04B 1/38* (2006.01)

(52) U.S. Cl. ............... 455/566; 455/575.3; 379/433.03; 379/433.13

(58) Field of Classification Search ............... 455/575.1, 455/575.3, 566; 349/58; 379/433.04, 433.13; 345/1.1–1.3, 2.1–2.3
See application file for complete search history.

(56) References Cited

U.S. PATENT DOCUMENTS 6,321,070 B1 * 11/2001 Clark et al. ............... 455/575.1
6,574,487 B1 * 6/2003 Smith et al. ............... 455/566
6,583,770 B1 * 6/2003 Antila et al. ............... 345/1.1
6,925,313 B2 * 8/2005 Kweon et al. ............... 455/566

FOREIGN PATENT DOCUMENTS

JP 57-175430 11/1982
JP 2002-51369 4/2000

OTHER PUBLICATIONS 59-78654 Japanese Utility Model Application No. 57-175430 Nov. 17, 1982.*

* cited by examiner

*Primary Examiner*—Lester Kincaid
*Assistant Examiner*—Matthew Sams
(74) *Attorney, Agent, or Firm*—Morrison & Foerster LLP

(57) ABSTRACT

The invention provides a foldable electronic device comprising a main body and a closure connected to each other openably. A frame 6 is provided inside the closure and holds therein a main display 4 and a subdisplay 5 as arranged back to back. A chip mount area 42 of a flexible lead 41 extending from the main display 4 and a chip mount area 53 of a flexible lead 51 extending from the subdisplay 5 are opposed to each other in an opening formed in the frame 6. Opposed surfaces of the respective chip mount areas 42, 53 have groups of electronic circuit chips 43, 54 mounted thereon as positioned in a staggered relation with each other.

1 Claim, 10 Drawing Sheets

FOLDABLE ELECTRONIC DEVICE

FIELD OF THE INVENTION

The present invention relates to foldable electronic devices, such as foldable portable telephones, which comprise a main body and a closure which are connected to each other openably.

BACKGROUND OF THE INVENTION

FIGS. 1 and 2 show a foldable portable telephone, in which a main body 1 having an arrangement of input keys 11 and a closure 2 having a main display 4 are connected to each other by a hinge mechanism 3 and made openable. The closure 2 is provided in its outer side with a display window 23 for a subdisplay (not shown) and is adapted to present information as to incoming calls even when the closure 2 is in a closed state.

With reference to FIGS. 10 to 12, such foldable portable telephones conventionally have a main display 9 and a subsdisplay 7 which are arranged back to back in a frame 8 to provide a display assembly 60, and the display assembly 60 is accommodated in a flat casing.

Extending outward from one end of the main display 9 is a flexible lead 91, and a plurality of electronic circuit chips 92 for the display operation of the main display 9 are mounted on the upper surface of the flexible lead 91. A flexible lead 7 extends also from the subdisplay 7, and a plurality of electronic circuit chips 72 for the display operation of the subdisplay 7 are mounted on the upper surface of the flexible lead 71.

With the conventional foldable portable telephone having the main display 9 and the subdisplay 7, as shown in FIG. 12, the flexible lead 71 extending from the subdisplay 7 and carrying the electronic circuit chips 72 thereon is lapped over the flexible lead 91 extending from the main display 9 and carrying the electronic circuit chips 92 thereon to provide a two-stage structure. The conventional telephone therefore has the problem that the lap gives an increased height T' to the display assembly 60, increasing the thickness of the casing for accommodating the display assembly 60.

SUMMARY OF THE INVENTION

An object of the present invention is to provide a foldable electronic device which comprises a main display and a subdisplay and wherein a casing for accommodating these displays as an assembly is reduced in thickness.

The present invention provides a foldable electronic device comprising a main body 1 and a closure 2 connected to each other openably. A frame 6 is provided inside the closure 2 and holds therein a main display 4 and a subdisplay 5 as arranged back to back. A chip mount area 42 of a flexible lead 41 extending from the main display 4 and a chip mount area 53 of a flexible lead 51 extending from the subdisplay 5 are opposed to each other in an opening formed in the frame 6. Opposed surfaces of the respective chip mount areas 42, 53 have groups of electronic circuit chips 43, 54 mounted thereon as positioned in a staggered relation with each other.

With the foldable electronic device of the invention described, a group of electronic circuit chips 43 on the flexible lead 41 extending from the main display 4 and a group of electronic circuit chips 54 on the flexible lead 51 extending from the subdisplay 5 are positioned in a staggered meshing relation with each other in the opening formed in the frame 6. Accordingly, the height of the chips 43 of the main display 4 and the height of the chips 54 of the subdisplay lap over each other, consequently reducing the thickness of the display assembly in a corresponding relation with the lap.

Stated more specifically, the flexible lead 51 extending from the subdisplay 5 has an outer end portion folded over toward the frame side, and the folded-over portion has a surface opposed to the frame 6 and providing the chip mount area 53. When the chip mount area 53 is provided on only one surface of the flexible lead 51 extending from the subdisplay 5 which surface faces toward the same direction as the screen of the subdisplay 5, the chip mount area 53 can be positioned as opposed to the other chip mount area 42 in the case of the lead 51 described above.

Further stated more specifically, the frame 6 has the opening in a second area thereof adjacent to a first area thereof covered with the subdisplay 5, and the flexible lead 51 extending from the subdisplay 5 is folded over on the second area, the electronic circuit chips 54 in the chip mount area 53 being positioned in the opening of the frame 6. On the other hand, the flexible lead 41 extending from the main display 4 is folded over toward the frame side, and the folded-over lead portion has a surface opposed to the frame 6 and providing the chip mount area 42, the electronic circuit chips 43 in the chip mount area 42 being positioned in said opening of the frame 6. Thus, the two chip mount areas 42, 53 can be opposed to each other in the second area of the frame 6, whereby the electronic circuit chips 43, 54 on the mount areas 42, 53 can be accommodated within the opening of the frame 6.

With the foldable electronic device of the invention described above, the group of electronic circuit chips 43 connected to the main display 4 and the group of electronic circuit chips 54 connected to the subdisplay 5 are arranged in a meshing relation with each other. This reduces the thickness of the display assembly 20, consequently permitting use of a thin casing for the assembly.

DETAILED DESCRIPTION OF EMBODIMENT

Figure 1:
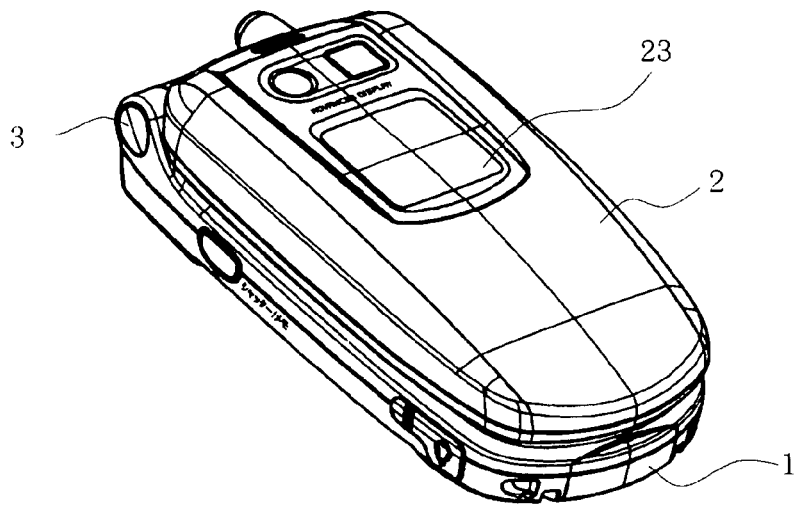
FIG. 1 is a perspective view showing a foldable portable telephone of the invention in a closed state.
Figure 2:
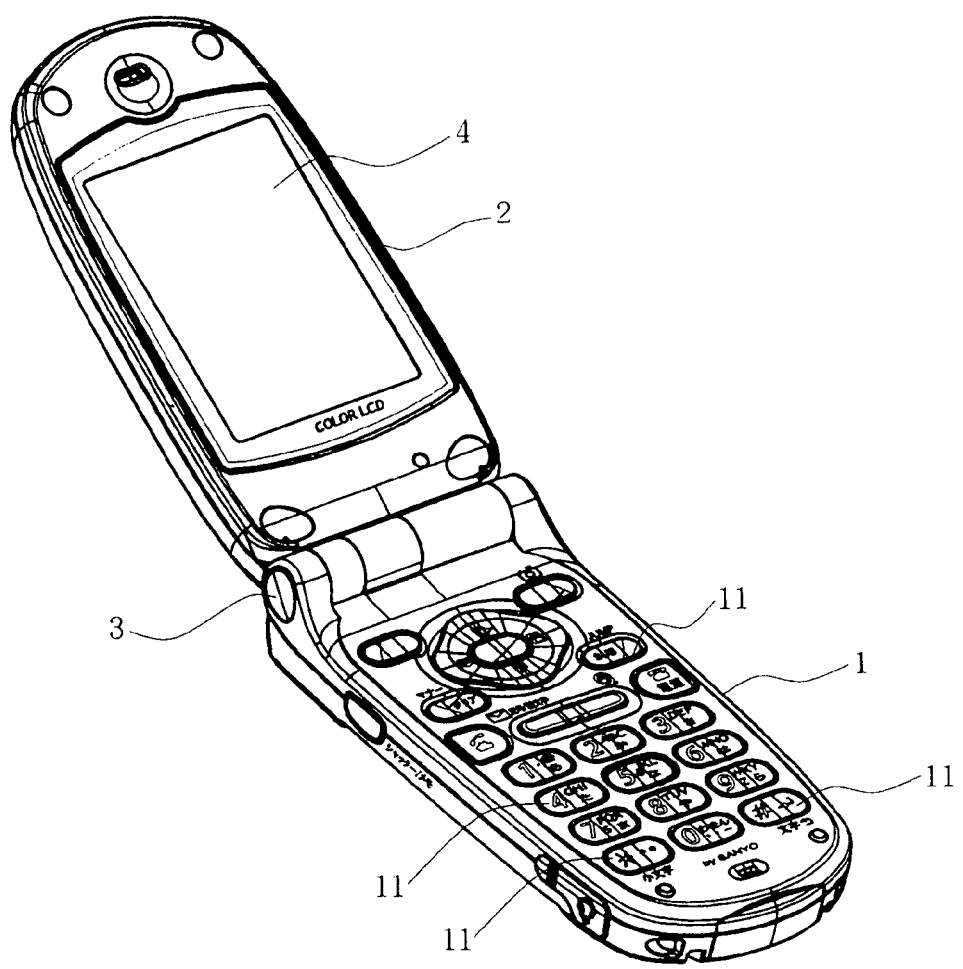
FIG. 2 is a perspective view showing the foldable portable telephone of the invention in an opened state.

A foldable portable telephone embodying the present invention will be described below in detail with reference to the drawings. With the telephone of the invention, a main body 1 having an arrangement of input keys 11 and a closure 2 having a main display 4 are connected to each other by a hinge mechanism 3 and made openable as shown in FIGS. 1 and 2. The closure 2 is provided in its outer side with a display window 23 for a subdisplay (not shown) and is adapted to present information as to incoming calls even when the closure 2 is in a closed state.

Figure 3:
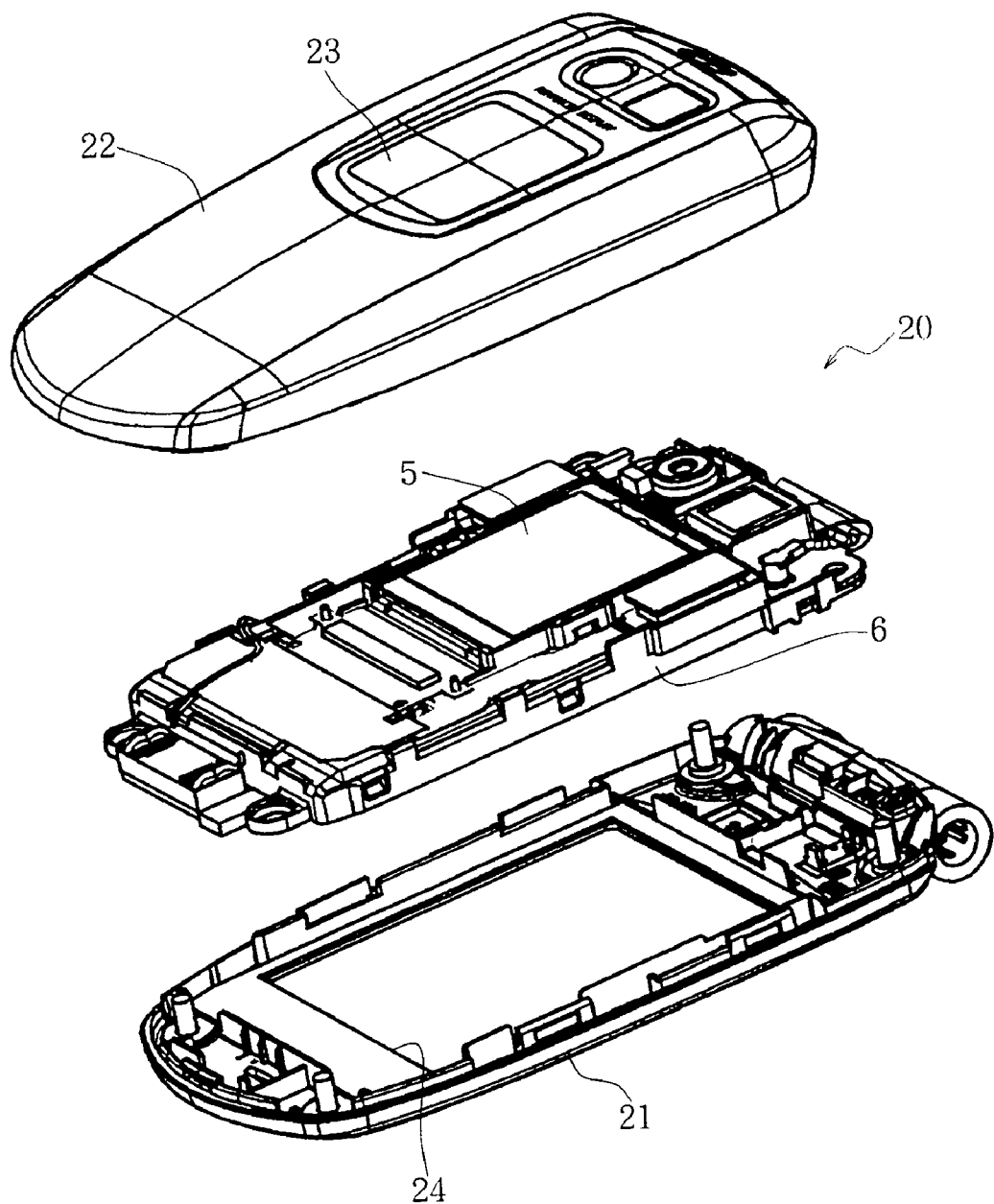
FIG. 3 is an exploded perspective view of a closure constituting the foldable portable telephone.
Figure 4:
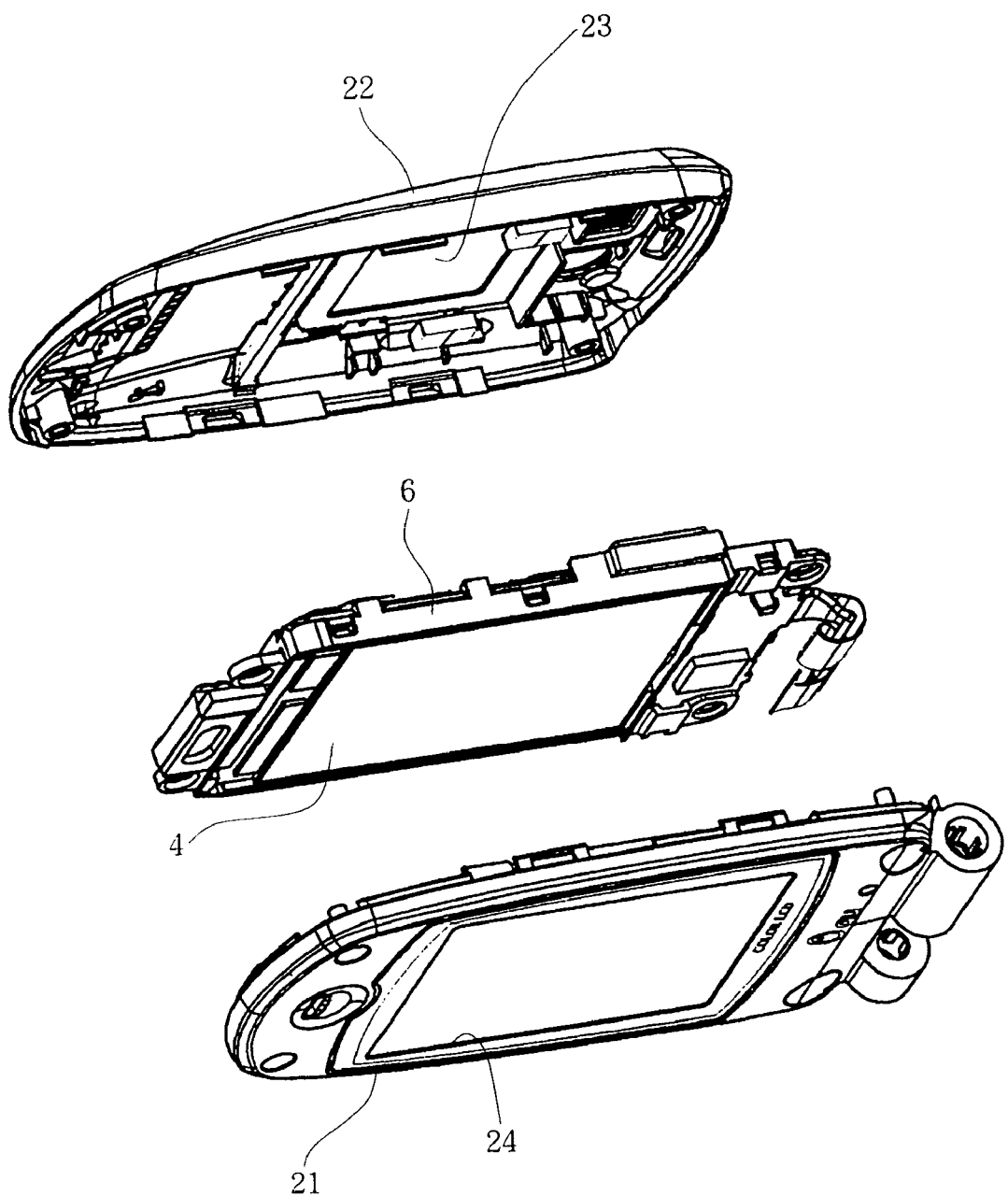
FIG. 4 is an exploded perspective view of the closure as it is seen from a different direction from FIG. 3.

As shown in FIGS. 3 and 4, the closure 2 comprises a lower half case 21 and an upper half case 22 providing a casing, and a display assembly 20 accommodated in the casing. The main display 4 and the subdisplay 5 as arranged back to back are fitted in a metal frame 6 to provide the display assembly 20. The lower half case 21 has an opening 24 for exposing a screen of the frame 6 therethrough. The upper half case 21 has the display window 23 as opposed to the screen of the subdisplay 5.

Figure 5:
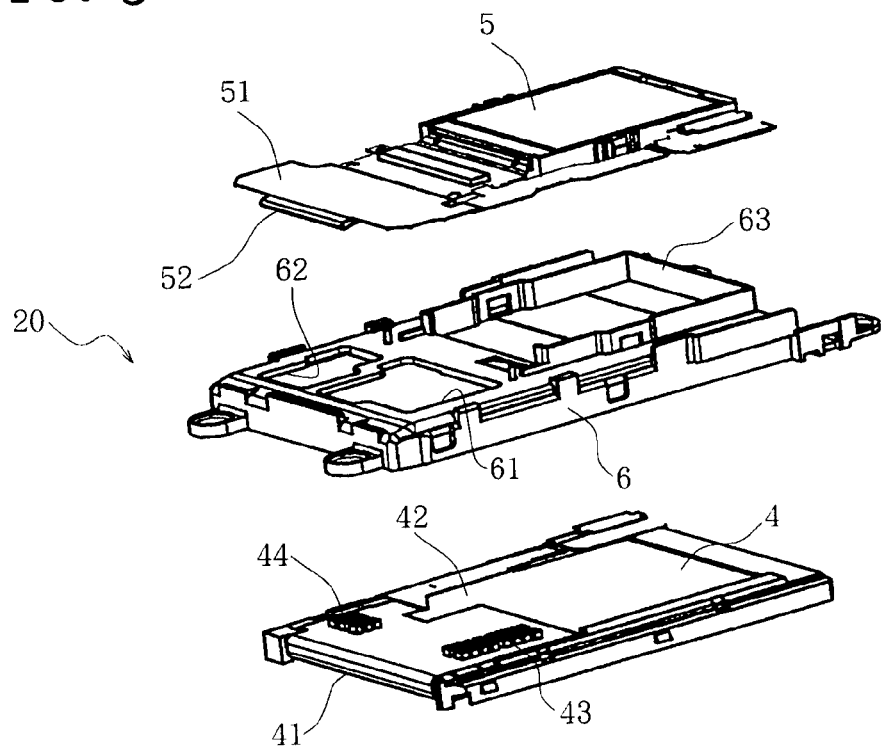
FIG. 5 is an exploded perspective view of a display assembly.
Figure 6:
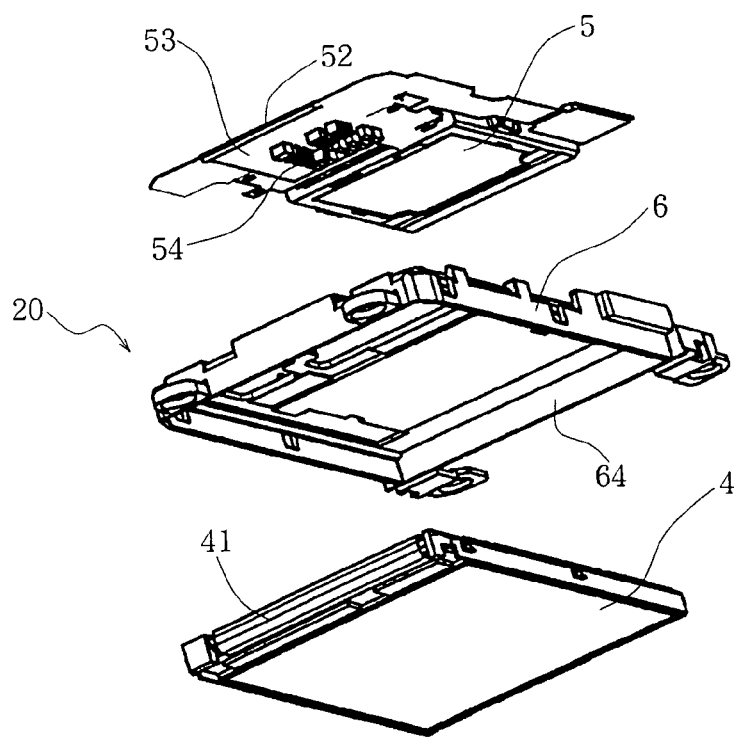
FIG. 6 is an exploded perspective view of the same assembly as it is seen from a different direction from FIG. 5.

With reference to FIGS. 5 and 6, a flexible lead 41 extends from an end portion of the main display 5 constituting the display assembly 20. The flexible lead 41 is folded over through 180 degrees toward the frame side, and the folded-over lead portion has a surface opposed to the frame 6 and providing a chip mount area 42. A plurality of electronic circuit chips 43, 44 for the display operation of the main display 4 are arranged as divided into two groups on the chip mount area 42.

On the other hand, a flexible lead 51 extends from an end portion of the subdisplay 5 constituting the display assembly 20. The flexible lead 51 extends over the front surface of the frame 6 and has its outer end portion 52 folded over through 180 degrees toward the frame side. The folded-over lead portion has a surface opposed to the frame 6 and providing a chip mount area 53. A plurality of electronic circuit chips 54 for the display operation of the subdisplay 5 are arranged on the chip mount area 53.

The front surface of the frame 6 provides a mount portion 63 for the subdisplay 5 at a right end portion thereof shown in FIG. 5. The frame 6 has a mount portion 64 for the main display 4 over the entire area of its rear surface. The frame 6 is further provided, in a portion thereof adjacent to the subdisplay mount portion 63, with a first opening 61 for exposing therethrough the first group of electronic circuit chips 43 on the flexible lead 41 extending from the main display 4 and the electronic circuit chips 54 on the flexible lead 51 extending from the subdisplay 5, and with a second opening 62 for exposing therethrough the second group of electronic circuit chips 44 on the flexible lead 41 extending from the main display 4.

Figure 7:
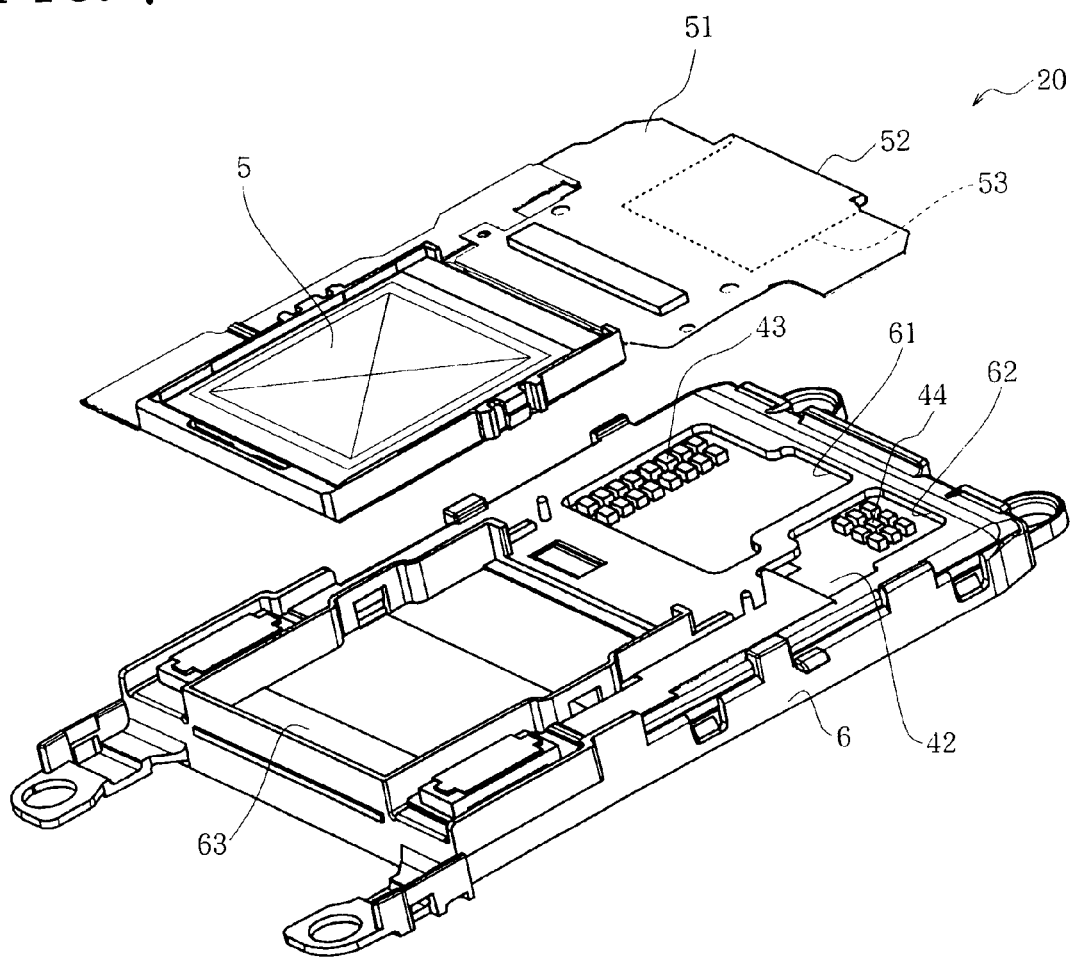
FIG. 7 is a perspective view showing a frame and a subdisplay as separated therefrom.

As shown in FIG. 7, the first group of electronic circuit chips 43 on the flexible lead 41 extending from the main display 4 is disposed toward one end of the inside area of the first opening 61 of the frame 6, while the electronic circuit chips 54 on the flexible lead 51 extending from the subdisplay 5 are disposed toward the other end of the inside area of the first opening 61 of the frame 6.

Figure 8:
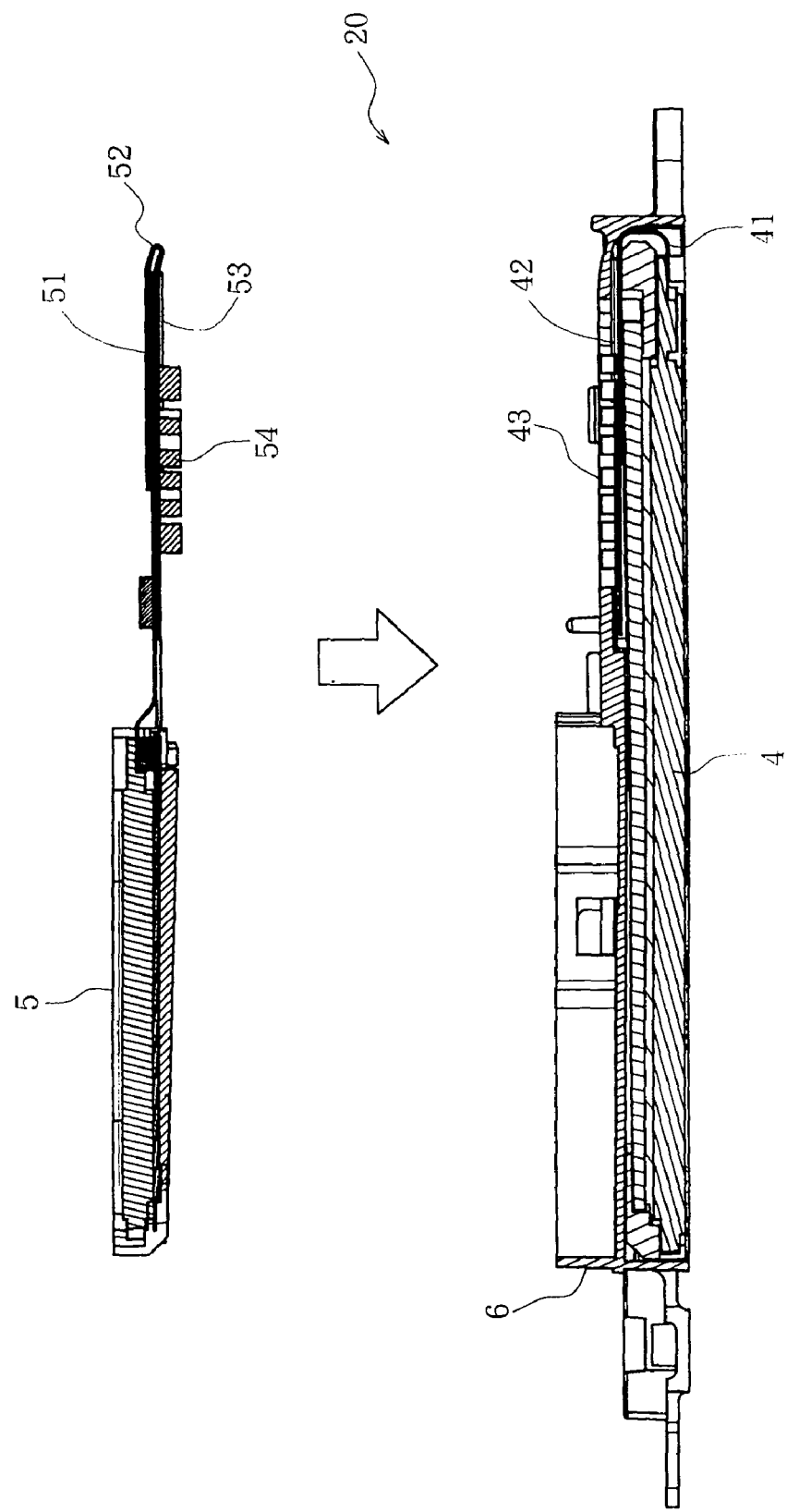
FIG. 8 is a view in section of the same.
Figure 9:
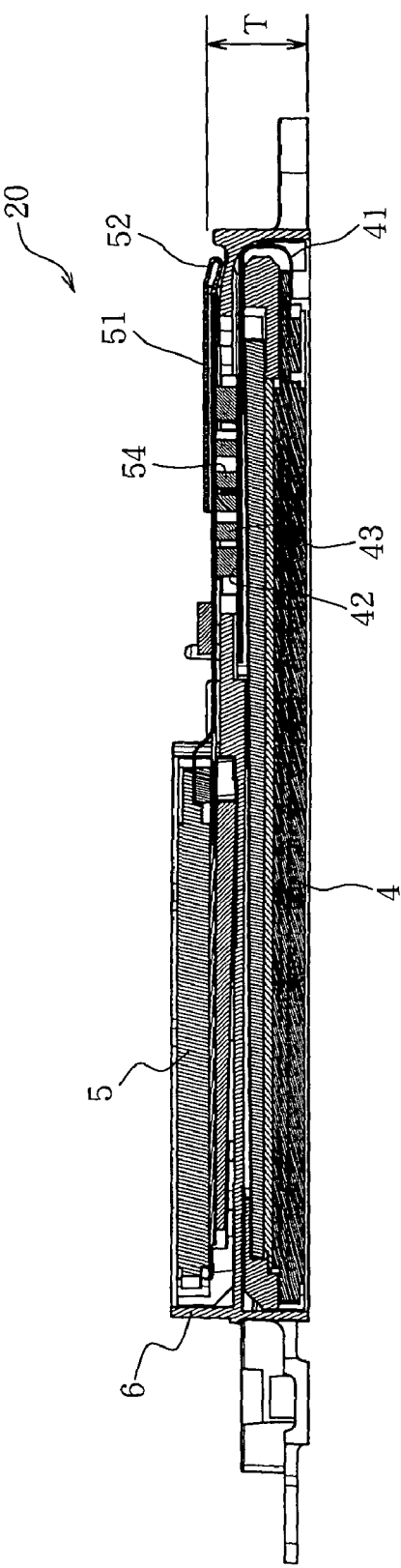
FIG. 9 is a view in section of the display assembly as assembled.
Figure 10:
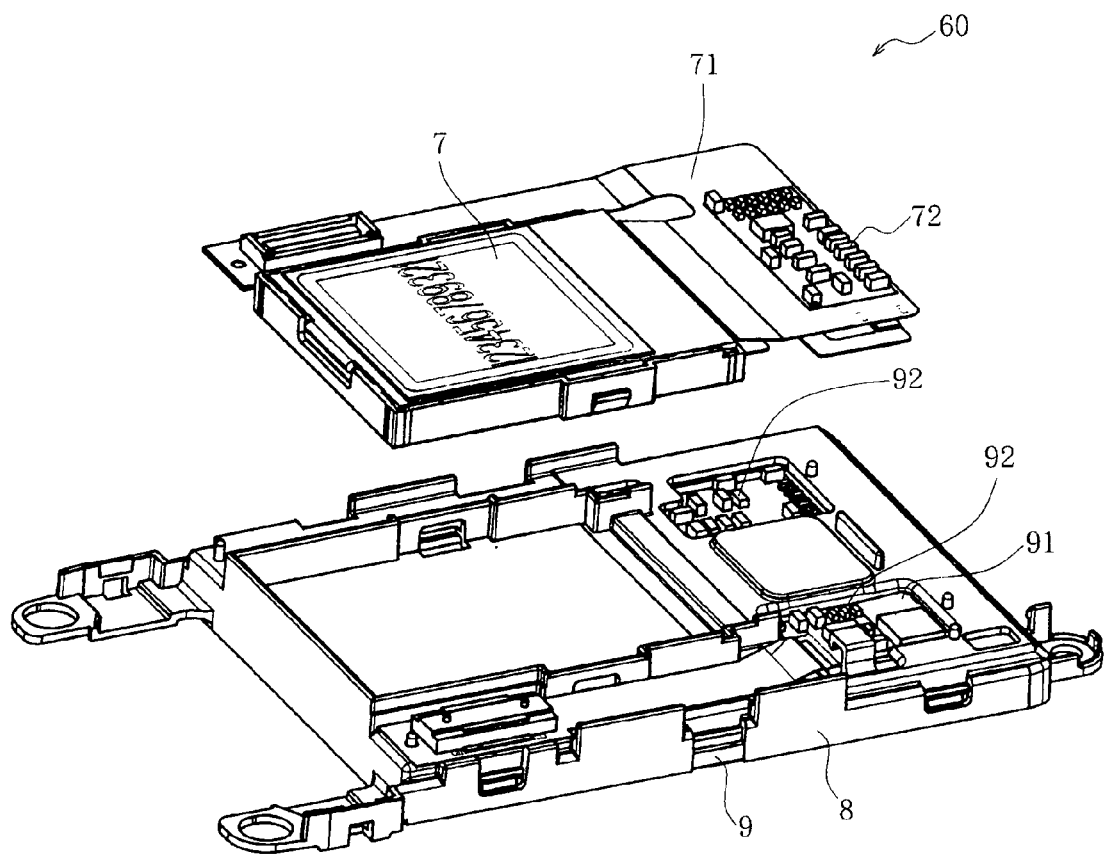
FIG. 10 is a perspective view of a frame and a subdisplay which are included in a conventional foldable telephone and which are separated from each other.
Figure 11:
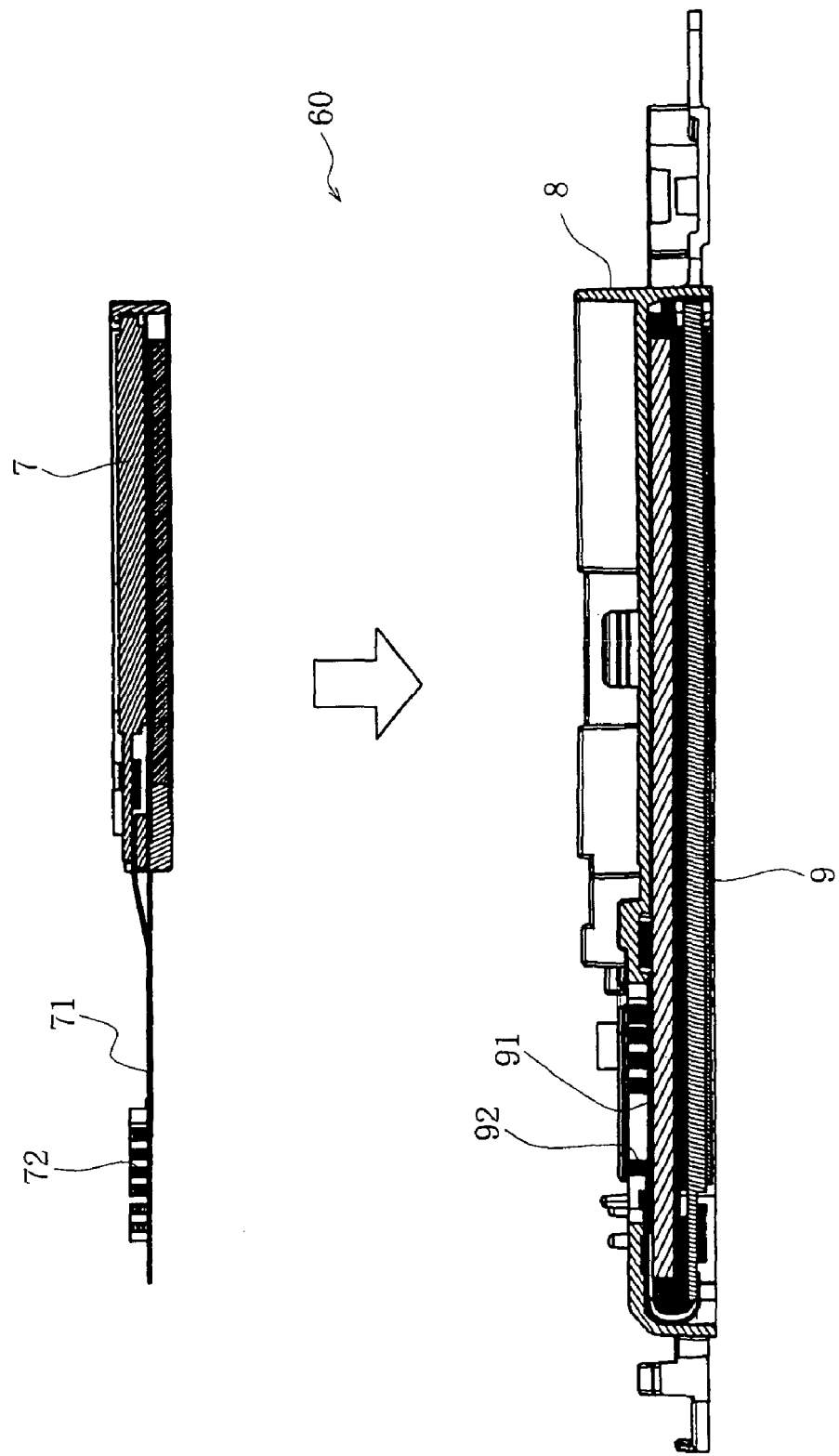
FIG. 11 is a view in section of the same.
Figure 12:
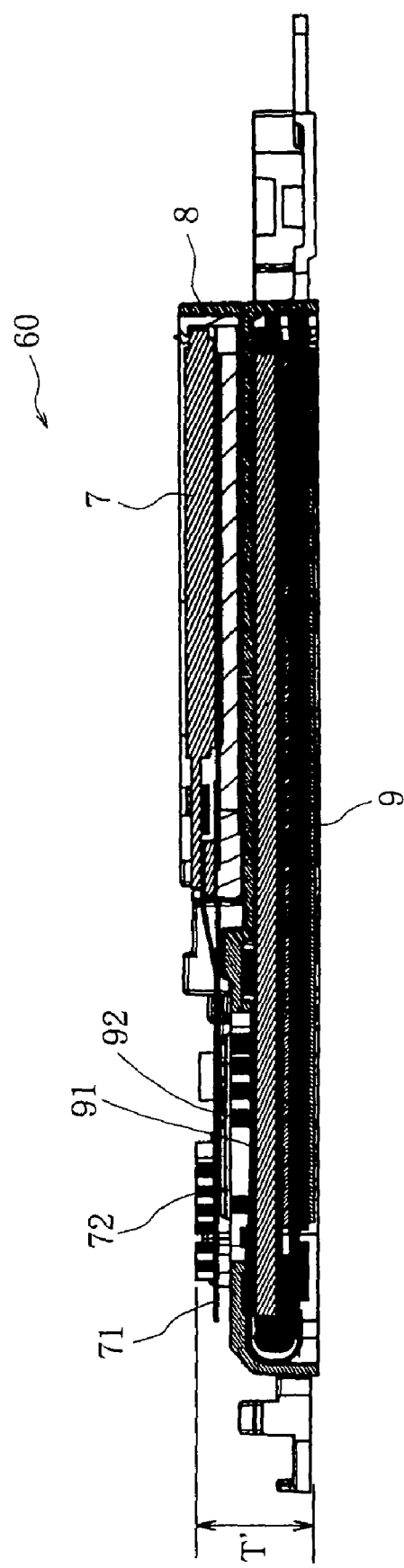
FIG. 12 is a view in section of a conventional display assembly as assembled.

Accordingly, when the subdisplay 5 is installed on the frame 6 having the main display 4 mounted thereon as shown in FIG. 8 to provide the display assembly 20 as shown in FIG. 9, the first group of electronic circuit chips 43 on the flexible lead 41 extending from the main display 4 and the electronic circuit chips 54 on the flexible lead 51 extending from the subdisplay 5 are positioned in a staggered meshing relation within the first opening 61 of the frame 6.

Consequently, the display assembly 20 wherein the two groups of electronic circuit chips 43, 54 on the flexible leads 41, 51 are positioned in meshing relation with each other has a height T which is smaller than that of the conventional display assembly wherein the electronic circuit chips on the two flexible leads are arranged in lapping two stages, by an amount corresponding to the depth of meshing of the circuit chips. This reduces the thickness of the casing providing the closure 2.

The device of the present invention is not limited to the foregoing embodiment in construction but can be modified variously by one skilled in the art without departing from the spirit of the invention as set forth in the appended claims. The present invention can be embodied not only into foldable portable telephones but also into various foldable electronic devices.

What is claimed is:

1. A foldable electronic device comprising:
   a main body (1),
   a closure (2),
   a main display (4),
   a subdisplay (5),
   a frame (6),
   a chip mount area (42) of a flexible lead (41) extending from the main display (4), and
   a chip mount area (53) of a flexible lead (51) extending from the subdisplay (5),
   the main body and the closure being connected to each other openably, the main display having a screen exposed from an inner surface of the closure (2), the subdisplay (5) having a screen exposed from a back surface of the closure (2), the frame (6) being provided inside the closure (2) and holding therein the main display (4) and the subdisplay (5) as arranged back to back, the chip mount area (42) and the chip mount area (53) being opposed to each other in an opening formed by the frame (6), the opposed surfaces of the respective chip mount areas (42)(53) having at least one portion with a group of electronic circuit chips (43)(54) mounted thereon and at least one portion free of a group of electronic circuit chips,
   wherein the at least one portion of the chip mount area (42) of the flexible lead (41) having a group of electronic circuit chips (43) opposes the at least one portion of the chip mount area (53) free of a group of electronic circuit chips,
   the at least one portion of the chip mount area (53) of the flexible lead (51) having a group of electronic circuit chips (54) opposes the at least one portion of the chip mount area (42) free of a group of electronic circuit chips, and
   the flexible lead (51) extending from the subdisplay (5) has an outer end portion folded over toward the frame (6) side, and the folded-over portion has a surface opposed to the frame (6) and providing the chip mount area (53),
   wherein the frame (6) has said opening in a second area thereof adjacent to a first area thereof covered with the subdisplay (5), and the flexible lead (51) extending from the subdisplay (5) is folded over on the second area,
   wherein the flexible lead (41) extending from the main display (4) is folded over toward the frame (6) side, and the folded-over lead portion has a surface opposed to the frame (6) and providing the chip mount area (42),
   wherein the electronic circuit chips (54) in the chip mount area (53) of the flexible lead (51) extending from the subdisplay (5) and the electronic circuit chips (43) in the chip mount area (42) of the flexible lead (41) extending from the main display (4) are positioned in a staggered meshing relation within said opening formed by frame (6),
   wherein frame (6) is disposed between flexible lead (41) and flexible lead (51) with electronic circuit chips (54)

and electronic circuit chips (43) extending through said opening formed by frame (6) to mesh absent any component of said foldable electronic device arranged between said electronic circuit chips (54) and said electronic circuit chips (43), and wherein a plane defined by frame (6) corresponding to said opening formed by frame (6) intersects at least one of electronic chips (54) and at least one of electronic chips (43).

* * * * *